United States Patent
van der Avoort et al.

(10) Patent No.: US 9,904,366 B2
(45) Date of Patent: Feb. 27, 2018

(54) HAPTIC FEEDBACK AND CAPACITIVE SENSING IN A TRANSPARENT TOUCH SCREEN DISPLAY

(71) Applicant: NXP B.V., Eindhoven (NL)

(72) Inventors: Casper van der Avoort, Waalre (NL); Peter Gerard Steeneken, Valkenswaard (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/459,501

(22) Filed: Aug. 14, 2014

(65) Prior Publication Data

US 2016/0048207 A1 Feb. 18, 2016

(51) Int. Cl.
*G06F 3/01* (2006.01)
*G06F 3/044* (2006.01)
(Continued)

(52) U.S. Cl.
CPC .............. *G06F 3/016* (2013.01); *G06F 3/044* (2013.01); *G06F 3/0416* (2013.01); *G06F 3/04886* (2013.01); *G06F 2203/04809* (2013.01)

(58) Field of Classification Search
CPC ................. G06F 3/016; G06F 3/04883; G06F 2200/1636; G06F 2203/014; G06F 1/1692; G06F 3/04886; G06F 3/0416; G06F 3/044; G06F 1/1643; G06F 3/041; G06F 3/03547; G06F 3/0414; G06F 2203/04809; H01H 13/85; H01H 2215/05; H01H 2215/052; H01H 2217/006; H01H 2217/038; B60K 35/00; B60K 2350/1032; B60K 2350/1072
See application file for complete search history.

(56) References Cited

U.S. PATENT DOCUMENTS 8,836,647 B2 * 9/2014 Alexander .............. G06F 3/044
345/173
9,024,908 B2 5/2015 Sinclair
(Continued)

FOREIGN PATENT DOCUMENTS

CN 102576249 A 7/2012

OTHER PUBLICATIONS van den Ende et al. "Voltage-Controlled Surface Wrinkling of Elastomeric Coatings". Advanced Materials. vol. 25, Issue 25. Published: May 24, 2013.*
(Continued)

*Primary Examiner* — Nalini Mummalaneni

(57) ABSTRACT

Consistent with an example embodiment, a user (touch screen) interface has haptic feedback. The user interface comprises, a substrate, a transparent bottom electrode on top of the substrate, a transparent wrinkling layer on top of the transparent bottom electrode, a transparent top electrode on top of the transparent wrinkling layer; and a transparent protective surface on top of the transparent top electrode. The transparent wrinkling layer changes from a smooth surface to a roughened surface upon application of a voltage between the top electrode and the bottom electrode; the voltage generates an electrostatic force mutually attracting the top and bottom electrodes to exert a compressive force upon the transparent wrinkling layer sufficient to generate a degree of surface wrinkling that is perceptible to the touch.

20 Claims, 4 Drawing Sheets

310 Transparent Top Electrode, t, $Y_{el}$, $v_{el}$

320 Dielectric Elastomer, D, Y, v

(51) Int. Cl.
*G06F 3/041* (2006.01)
*G06F 3/0488* (2013.01)

(56) References Cited

U.S. PATENT DOCUMENTS

| | | | |
|---|---|---|---|
| 2002/0134794 A1* | 9/2002 | McManus | G01L 19/083 222/55 |
| 2007/0247429 A1* | 10/2007 | Westerman | G06F 3/0219 345/168 |
| 2009/0231294 A1* | 9/2009 | Wu | G06F 3/03547 345/173 |
| 2010/0238114 A1* | 9/2010 | Vartanian | G06F 3/0416 345/168 |
| 2012/0068957 A1* | 3/2012 | Puskarich | G06F 3/016 345/174 |
| 2014/0307179 A1* | 10/2014 | Zhao | G03H 1/02 349/12 |
| 2015/0097786 A1* | 4/2015 | Behles | G06F 3/041 345/173 |
| 2015/0097800 A1* | 4/2015 | Grant | G06F 3/016 345/174 |
| 2017/0157777 A1* | 6/2017 | Hopkins | B25J 13/08 |

OTHER PUBLICATIONS

Dielectric Elastomer Actuators for Tactile Displays; Third Joint Eurohaptics Conference and Symposium on Haptic Interfaces for Virtual Environment and Teleoperator Systems; Published Mar. 2009; Author: Marc Matysek.*
Nana, E. "Improving Proximity and Touch Interfaces: Capacitive Sensors with Auto Calibration", NXP Semiconductors, 7 pgs. (Oct. 9, 2013).
Skedung, L. et al. "Feeling Small: Exploring the Tactile Perception Limits", Scientific Reports, 3:2617, DOI:10, 1038/ srep02617, 6 pgs. (Sep. 13, 2013).
Khalilabad, M. et al. Preparation of Superhydrophobic Electroconductive Graphene-coated Cotton Celluolose, Springer Science+Business Media Dordrecht, pp. 963-972 (Feb. 5, 2013).
Van den Ende, D. et al. "Voltage-Controlled Surface Wrinkling of Elastomeric Coatings", Adv. Mater.—Mater. Views, Wiley-VCH GmbH & Co., vol. 25, pp. 3438-3442 (2013).
NXP Semiconductors, "NXP Capacitive Proximity Switches PCF8883 & PCA8886", retrieved from the Internet at http://www.nxp.com/products/sensors/capacitive_sensors, 2 pgs. (Aug. 2012).
Office Action; Application No. CN 201510502318.4; 13 pages (dated Oct. 31, 2017).

* cited by examiner

310 Transparent Top Electrode, $t$, $Y_{el}$, $v_{el}$

320 Dielectric Elastomer, $D$, $Y$, $v$

HAPTIC FEEDBACK AND CAPACITIVE SENSING IN A TRANSPARENT TOUCH SCREEN DISPLAY

FIELD

The disclosed is directed toward touch screen devices in which haptic technology is employed to enhance the usefulness of a transparent touch screen so as to enrich the user experience.

BACKGROUND

With the proliferation of smart-phones, tablet computers, car-dashboard instrumentation, etc. relying on touch screen interfaces in which the user must look at the screen to initiate an action or respond to a prompt, there is significant user distraction from his surrounding environment. There may be risks of injury to the user and/or bystanders as he is focused, to the exclusion of other things, on the touch screen interface of his smart device.

Further, a segment of the population which is visually impaired, may be excluded from the benefits of smart device touch screen technology.

There exists a need for an enhancement to touch screen technology to address the challenges of a diverse user community.

SUMMARY

The disclosed embodiments have been found useful in enhancing touch screen technology found on a myriad of devices by providing access to those users who may be visually impaired or for sighted users who need to use devices having this technology, but are in low-light environments. The user can receive information on the status of his touchscreen device via the sense of touch (i.e, haptic feedback).

In an example embodiment, there is a user interface having haptic feedback. The user interface comprises a substrate, a transparent bottom electrode on top of the substrate; a transparent wrinkling layer on top of the transparent bottom electrode; a transparent top electrode on top of the transparent wrinkling layer. The transparent wrinkling layer changes from a smooth surface to a roughened surface upon application of a voltage between the top electrode and the bottom electrode; the voltage generates an electrostatic force that mutually attracts the top and bottom electrodes to exert a compressive force upon the transparent wrinkling layer. The compressive force is sufficient to generate a degree of surface wrinkling perceptible to the touch. A transparent surface protects the surface of the transparent top electrode.

In some example embodiments, programmable roughness features are implemented that generate perceptible wrinkles when the position of the user's finger is in a certain region. In other embodiments, programmable friction features are implemented that generate perceptible wrinkles with a magnitude that depends both on the position and on the speed of the user's finger over the surface. In both types of embodiments, the wrinkles can either have a static magnitude or a time varying magnitude. Speed and position of the finger can be sensed capacitively.

In another example embodiment, a portable computing device has a glass display; the glass display includes a tactile feedback system. The tactile feedback system comprises a transparent portion of the glass display having a changeable surface which is switchable to be smooth or rough, wherein the changeable surface includes, a substrate, a transparent bottom electrode on top of the substrate, a transparent wrinkling layer on top of the transparent bottom electrode, and a transparent top electrode on top of the transparent wrinkling layer. The transparent wrinkling layer changes from a smooth surface to a roughened surface upon application of a critical voltage between the top electrode and the bottom electrode, the critical voltage generating an electrostatic force mutually attracting the top and bottom electrodes to exert a compressive force upon the transparent wrinkling layer sufficient to generate a degree of surface wrinkling perceptible to the touch. There is a capacitive sensing circuit which senses changes in the capacitance of the transparent portion when the user's finger approaches a minimum distance to the surface and the capacitive sensing circuit causes the application of the critical voltage, the critical voltage switching the changeable surface from smooth to rough; the rough changeable surface provides tactile feedback to the user so that the user may enter data into or respond to information from the portable computing device.

The above summaries of the present disclosure are not intended to represent each disclosed embodiment, or every aspect, of the present invention. Other aspects and example embodiments are provided in the figures and the detailed description that follow.

BRIEF DESCRIPTION OF THE DRAWINGS

The invention may be more completely understood in consideration of the following detailed description of various embodiments disclosed in connection with the accompanying drawings, in which.

Figure 1:
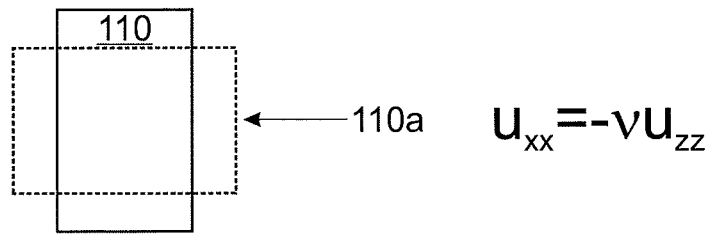
FIG. 1 depicts the principle of lateral contraction/expansion per Poisson's ratio.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The disclosed embodiments have been found useful in enhancing the user experience with respect to touch screen technology. Haptic technology or haptics is a tactile feedback technology which takes advantage of the sense of touch by applying forces, vibrations, or motions to the user. In the literature, haptic technology has been described as "doing for the sense of touch what computer graphics does for vision." Haptic devices may incorporate tactile sensors that measure forces exerted by the user on the interface. The word haptic stems from the Greek ἁπτικός (haptikos), means pertaining to the sense of touch and comes from the Greek verb ἅπτεσθαι haptesthai, meaning to contact or to touch.

Haptic feedback from a touch-screen user interface can be generated by selectively generating surface wrinkles in targeted areas. By enabling a voltage-controlled vertical compression of a transparent layer above a touch-screen, lateral expansion of the wrinkling material will lead to wrinkles. Fingertips can sense a certain range of undulation wavelengths, as well as modulation depths. The same electrodes generating the haptic feedback may also be used for capacitive sensing of the user's fingers.

In a paper titled, "Voltage-Controlled Surface Wrinkling of Elastomeric Coatings" of Daan van den Ende et al. *Advanced Materials*. 2013, 25. 3438-3442, a reflective top electrode made of gold is observed to be optically flat in the un-actuated state, while going matte when a voltage is applied. The voltage has to exceed a critical value in order to observe the effect.

The principle for undulation: the electrical field between the two electrodes causes the parallel plates to attract by means of the electro-static force. This enforces a z-direction compression on the elastomer. In order to maintain volume, the z-compressed elastomer will want to expand laterally. The lateral motion, however, is restricted. This causes buckling in the elastomer layer. The origin of this buckling instability is the non-linear position dependence of the electrostatic force. As a consequence the electrostatic energy gain in the valleys of the wrinkled electrode is larger than the energy loss at the top. The energy difference is available to wrinkle the structure. A pseudo-random two-dimensional pattern of peaks and valleys will arise. The wavelength λ of the pattern is not random, but can be controlled by adjusting the layer thicknesses.

The principle of lateral contraction/expansion. Lateral normal strain ($u_{xx}$) and perpendicular normal strain ($u_{zz}$) relate, because of striving for volume conservation, by the factor known as Poisson's ratio ν. Refer to FIG. 1. As the material 110 undergoes contraction in one direction, it expands in another 110a. The relationship, $$U_{xx} = -\nu U_{zz}$$

When a material is compressed in one direction, it usually tends to expand in the other two directions perpendicular to the direction of compression. This phenomenon is called the Poisson effect. Poisson's ratio ν (nu) is a measure of this effect. The Poisson ratio is the fraction (or percent) of expansion divided by the fraction (or percent) of compression, for small values of these changes.

Conversely, if the material is stretched rather than compressed, it usually tends to contract in the directions transverse to the direction of stretching. This is a common observation when a rubber band is stretched, when it becomes noticeably thinner. Again, the Poisson ratio will be the ratio of relative contraction to relative expansion, and will have the same value as above. In certain rare cases, a material will actually shrink in the transverse direction when compressed (or expand when stretched) which will yield a negative value of the Poisson ratio.

In order to have a large wrinkling effect at a low voltage it is beneficial to have a material with a small Young's modulus, high Poisson ratio and high dielectric constant. Certain elastomers, like the ones described in the paper of Daan van den Ende et at referenced supra have these beneficial properties.

Figure 2:
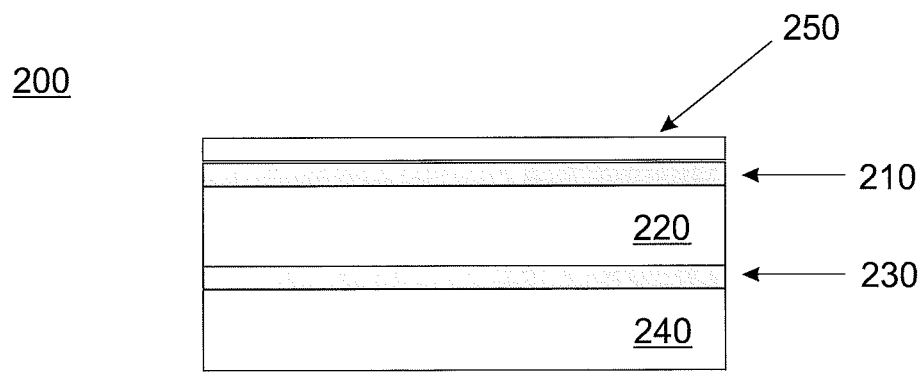
FIG. 2 depicts in cross-section a transparent haptic surface arrangement according to a disclosed embodiment.

Refer to FIG. 2. In an example embodiment, to be operated on a touch-screen interface, this principle is applied to transparent materials. A stack 200 having a transparent top electrode 210 and a transparent bottom electrode 230 are needed. Sandwiched between the electrodes is a transparent elastomer wrinkling material 220. A transparent substrate 240 or the surface of the underlying touch screen. Possibly, materials already present in a touch-screen stack can be used here. A coating 250 on the surface of the top electrode may be used to prevent the user from contacting the top electrode 210 and provide protection. The electrodes consist of transparent conducting films.

Transparent conducting films (TCFs) are optically transparent and electrically conductive in thin layers. Some suitable films may be transparent conducting oxides (TCO), such as indium tin oxide (ITO), fluorine doped tin oxide (FTO), or doped zinc oxide. Other films may include organic conducting polymers; these may be fabricated as flexible films. Some transparent conductive polymers may include, but are not limited to, Poly(3,4-ethylenedioxythiophene) (PEDOT), Poly(3,4-ethylenedioxythiophene) PEDOT: poly (styrene sulfonate) PS, or Poly(4,4-dioctylcyclopentadithiophene). These organic films would be adjusted to be transparent in the visible spectrum. The conductivity of these films is in the range of about 1000 S/cm to about 3000 S/cm. Techniques for making these films may be found in the literature. In an example embodiment, a gold electrode of a thickness less than 50 nm would be transparent and be sufficiently flexible.

In a paper titled, "Feeling Small: Exploring the Tactile Perception Limits," *Nature-Scientific Reports*, (3:2617, DOI:10, 1038/srep02617, 2013), of Lisa Skedung et al, it had been determined that wrinkle wavelengths (λ) of about 40 μm turn out to be optimally sensible. The required modulation depth is low, according to the study. A 10 nm peak-to-valley depth is easily sensed.

Figure 3:
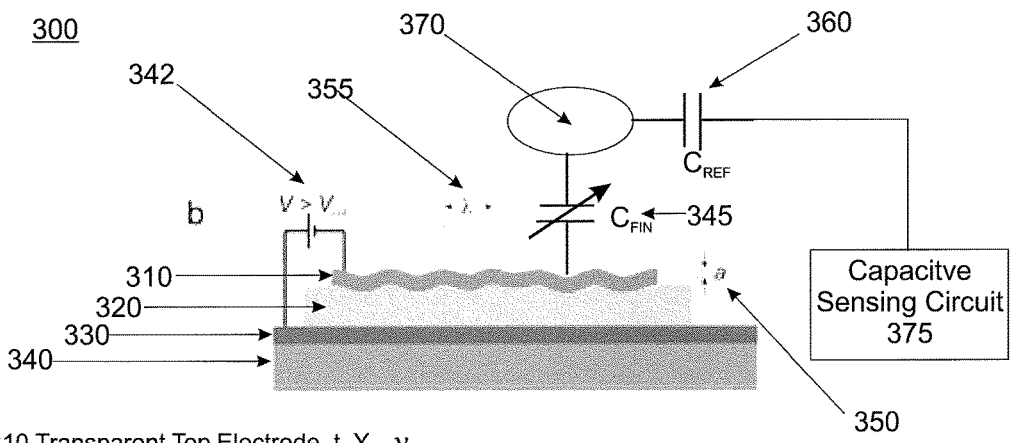
FIG. 3 depicts a haptic surface system according to a disclosed embodiment.
Figure 4:
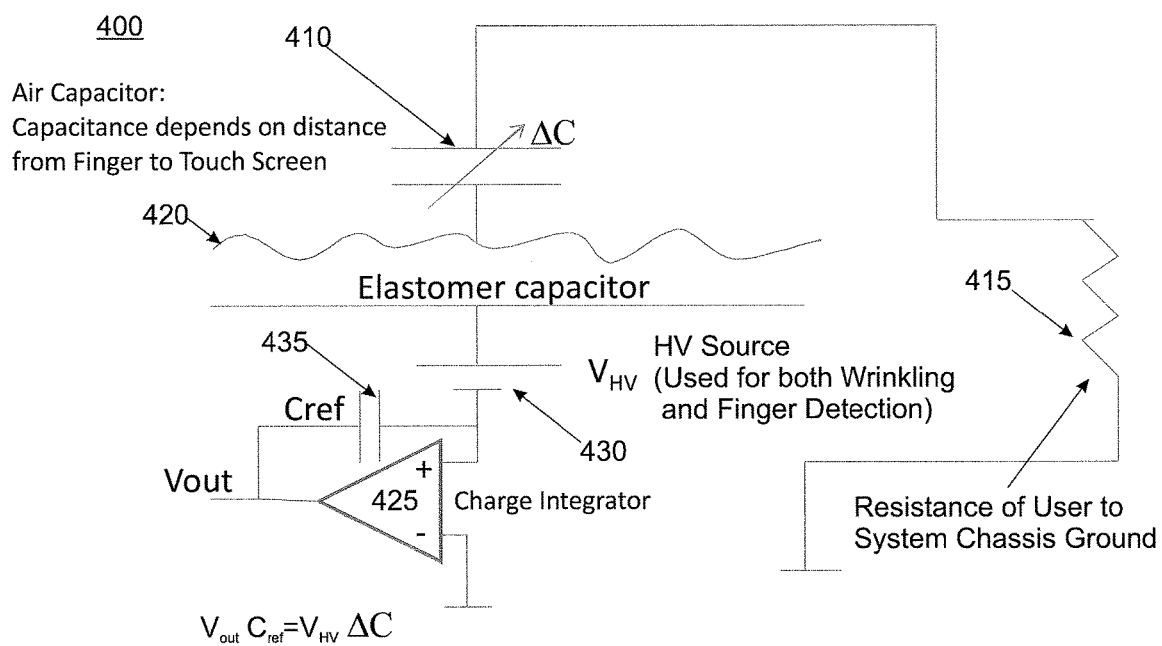
FIG. 4 depicts an example embodiment of a finger detection circuit as applied to a haptic surface.

In an example embodiment according to the disclosure shown in FIG. 3, a user interface 300 has a tactile feedback arrangement. There is a transparent wrinkling layer 320 sandwiched between a transparent top electrode 310 and a transparent bottom electrode 330. The three layers are disposed upon an underlying substrate 340, or for example, a touch screen. Upon application of a wrinkling voltage 342 greater than a critical voltage ($V_{WR} > V_{CR}$), the transparent wrinkling layer 320 forms undulations 355 characterized by wavelength (λ) and amplitude (a) 350. For a particular user's preference, the wrinkling layer 320 may be configured to have a range of wavelengths and amplitudes. The critical voltage can be applied through circuits which are controlled by a capacitive sensing circuit 375. The finger can be connected capacitively and/or resistively to a sensing and/or actuator circuit via a capacitor Cref 360 or a resistor such as resistor 415 shown in FIG. 4. The actuation voltage that causes the wrinkling can either be applied directly across the elastomer using a voltage source 340 or by a capacitive voltage division across the finger using a voltage source 430 shown in FIG. 4. In the configuration of FIG. 4, the wrinkling will only occur when the finger is in the proximity of the elastomer layer. For zero voltage across the screen the wrinkling disappears. The capacitive sensing circuit 375 can be coupled to circuits that generate the wrinkling voltage ($V_{WR}$). As the user's finger 370 approaches the haptic screen surface, the capacitance of the finger $C_{FIN}$, causes a change in the overall capacitance, which is equal to $C_{REF}$ combined with $C_{FIN}$; the capacitive sensing circuit 375 sends a signal to voltage wrinkling circuits, resulting in an electric field (generating sufficient force) which will cause the wrinkling layer 320 to form surface wrinkles. The user feels the change in texture of the transparent top electrode 310.

An example of a proximity and touch sensor may be found in an application note titled, "Improving Proximity and Touch Interfaces: Capacitive Sensors with Auto-Calibration," by Emmanuel T. Nana. NXP Semiconductors, pp. 7. Particular products that may be used, but are not so limited, may include NXP PCF8883, PCA8885, PCF8885, and PCA8886 capacitive sensors.

Refer to FIG. 4. In an example embodiment, a circuit 400 for finger detection is configured. From a high-voltage source ($V_{HV}$) 430, high voltage is applied for both wrinkling the haptic surface and for finger detection. The haptic surface can be thought of as an elastomer capacitor 420. An "air capacitor" 410 is formed between the finger and the touch screen; the change in capacitance (ΔC) depends upon the distance between the finger and the touch screen 420. As the finger forms a capacitance with the elastomer capacitor 420, the user in touching the haptic surface has a resistance 415 to the system chassis ground. A charge integrator (OpAmp 425) is coupled to a reference capacitor ($C_{Ref}$), at the OpAmp's "+" terminal, a virtual ground and output, $V_{Out}$. The "−" of the OpAmp 425 is coupled to the chassis ground. Upon detecting the presence of a finger, there is a capacitance change, ΔC, corresponding to the virtual ground from the OpAmp generating the same charge on the reference capacitor, $C_{ref}$. The measurement of the output voltage $V_{out}$ determines the presence of a finger and follows the relationship, $V_{out}C_{ref}=V_{HV}\Delta C$.

Figures 5A, 5B:
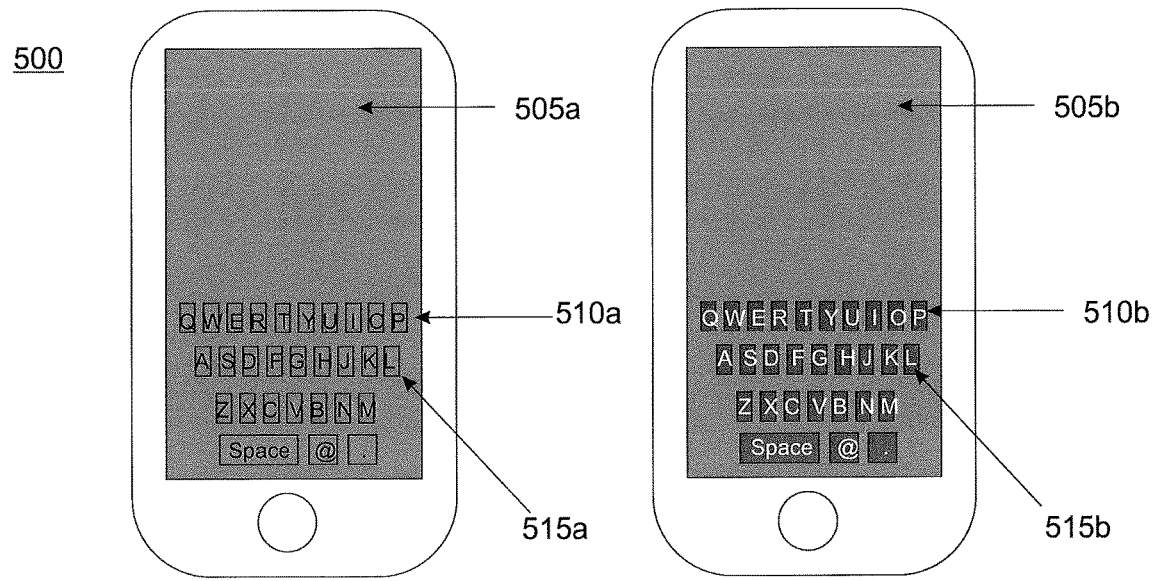
FIGS. 5A-5B depict an example application of the haptic surface in a portable computing device "touch keyboard.

Refer to FIGS. 5A and 5B. In example application according to the disclosure, a smart portable computing device 500 has a glass surface 505 and a user interface 510a with a QWERTY keyboard 515a defined thereon. This portion of the glass surface 505a is configured with the haptic interface of the present disclosure. The particular design of the electronics driving this interface would be governed by the parameters of the particular smart portable computing device 500; it would likely be designed in during its manufacture.

When the portable computing device 500, senses the user's fingers in proximity to the keyboard, the user interface 510a transforms to a wrinkled state 510b. One or more keys 515b may be roughened and provide tactile feedback to the user. In an example implementation, home row keys, "F" and "J" may be roughened to provide a reference point for the user's index fingers. For a full-size keyboard, that would be used in a tablet personal computer, a plurality of the keys may be roughened, as a group; or if so configured, each key may be individually roughened and surrounded by a smooth surface. Thus, a keypad once only accessible through sight, may be controlled by touch alone (e.g., as in mid-twentieth century typewriters); the tactile feedback providing the user an indication of accurate striking of a desired key. In another example application, the user keypad may be a ten-key pad for arithmetic operations, the tactile feedback enhancing accuracy by touch alone.

Figure 6:
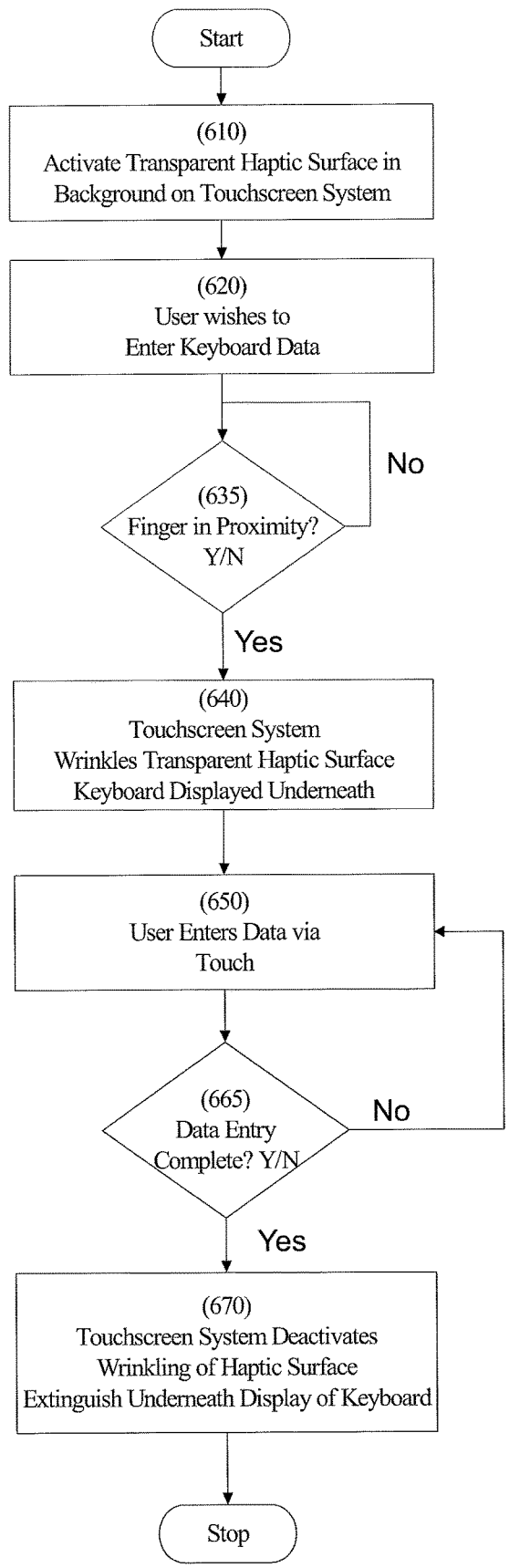
FIG. 6 depicts a flow diagram of the use of the haptic surface of a disclosed embodiment.

Refer to FIG. 6. In an example embodiment, the feature of a haptic surface may be optionally controlled by the user. In step 610, the user activates the transparent haptic surface so that it is running in the background on his portable touch screen device. In step 620, the user wishes to enter data from the keyboard. In step 635 the finger, if it is in proximity to the screen, activates the touchscreen system. In step 640, the touchscreen system wrinkles the transparent haptic surface keyboard. In step 650, the user can enter data via touch 650; he has the tactile feedback so that he does not need to look at the keyboard. In step 664, data entry is complete after user indicates that through a key closing entry (i.e., "Enter," "Return," "Go," etc.). In step 670, the touchscreen system deactivates; the wrinkling of the haptic surface is extinguished and the keyboard reverts to the smooth unwrinkled state.

The haptic feedback, as has been described, has numerous applications. For example, on a portable computing device, such as a smartphone, tablet computer, the interface may now be suitable for both the sighted and the blind. For a sighted person, the feedback system may be configured to generate the physical letters (i.e., of the Latin alphabet) of the English language QWERTY keyboard. For a blind person, the feedback system may be configured to generate Braille characters. In addition, the feedback system may also be configured to generate the physical letters of other alphabets (i.e., Greek, Russian, Arabic, Hebrew, Korean, etc.). Of course, the feedback system may be configured to accommodate the extra symbols and letters (i.e., diacritical marks) for those other languages using the Latin alphabet.

For pictographic languages such as Chinese and Japanese, the feedback system may be configured to generate commonly used characters.

For instant messaging type of communication or E-mail, emoticons may be generated by selected keys to convey a sender's and receiver's feelings and emotions through changes in the tactile feedback system according to the present disclosure.

The embodiments described may find use in a variety of applications. For example in a portable computing device using the haptic interface, the computing device may be a sub-system of an automotive dashboard control, an aviation instrument interface, a ship-board instrument interface, or an instrument interface suitable for a submarine. The touch screen feature assists the user in these potential low-light environments. In another example, a self-service kiosk may employ an embodiment according to the disclosure to assist the customer in his data entry in a situation where the user's vision is impaired.

The haptic interface may be a component of a touch screen desktop computer, a touch screen laptop computer, a tablet computer, or a smart phone.

Various exemplary embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

To the extent positional designations such as top, bottom, upper, lower have been used in describing this disclosure, it will be appreciated that those designations are given with reference to the corresponding drawings, and that if the orientation of the device changes during manufacturing or operation, other positional relationships may apply instead. As described above, those positional relationships are described for clarity, not limitation.

The present disclosure has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this disclosure encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present disclosure, the only relevant components of the device are A and B.

Numerous other embodiments of the invention will be apparent to persons skilled in the art without departing from the spirit and scope of the invention as defined in the appended claims.

The invention claimed is:

1. A user interface having haptic feedback, the user interface comprising:
    a substrate,
    a transparent bottom electrode on top of the substrate;
    a transparent wrinkling layer on top of the transparent bottom electrode;
    a transparent top electrode on top of the transparent wrinkling layer, wherein the transparent wrinkling layer includes an elastomer configured to expand along a lateral direction when compressed,
    wherein the transparent wrinkling layer is configured and arranged to change from a smooth surface to a roughened surface upon application of a voltage between the top electrode and the bottom electrode,
        the voltage generating an electrostatic force mutually attracting the top and bottom electrodes to exert a compressive force upon the transparent wrinkling layer sufficient to generate a degree of surface wrinkling,
        wherein the degree of surface wrinkling corresponds to the voltage application, a Young's modulus, a Poisson's ratio and a dielectric constant of the elastomer of the wrinkling layer, the degree of surface wrinkling being defined by a function of lateral normal strain, the Poisson's ratio, and the perpendicular normal strain; and
    a transparent protective surface on top of the transparent top electrode;
    wherein the user interface is configured to restrict the lateral expansion of the elastomer, thereby causing buckling in the elastomer; and
    wherein the surface wrinkling includes the buckling.

2. The user interface as recited in claim 1,
    further including a capacitive sensing circuit configured and arranged to sense changes in an overall capacitance of the transparent bottom electrode, the transparent wrinkling layer, and the transparent top electrode when a digit of the user approaches a minimum distance from the smooth surface and the capacitive sensing circuit causes the application of the voltage,
    the voltage switching the transparent wrinkling layer from smooth surface to the rough surface, and
    wherein the degree of surface wrinkling is a function of a spatial wavelength, a modulation depth, the Poisson's ratio, and a thickness of the transparent wrinkling layer, and wherein the function accounts for lateral normal strain based partly on perpendicular normal strain.

3. The user interface as recited in claim 2, wherein the degree of surface wrinkling is a function of the applied voltage between the top electrode and bottom electrode.

4. The user interface as recited in claim 2,
    wherein the spatial wavelength is in a range of 0.76 µm to 100 µm;
    wherein the modulation depth is at least 10 nm peak-to-valley; and
    wherein the transparent wrinkling layer thickness is in the range of 4 µm to 25 µm.

5. The user interface as recited in claim 1, wherein the voltage on the top electrode is conductively or capacitively supplied or influenced by a contact area of the object with the top electrode.

6. The user interface as recited in claim 1, wherein the degree of surface wrinkling is influenced by a contact of the object with the top electrode.

7. The user interface as recited in claim 1, wherein the user interface is a component of one of the following:
    a touch screen desktop computer;
    a touch screen laptop computer;
    a tablet computer; and
    a smart phone.

8. The user interface as recited in claim 1, wherein the roughened surface includes surface wrinkling having an amplitude proportional to the voltage applied between the top electrode and the bottom electrode.

9. The user interface as recited in claim 8, further comprising a circuit configured and arranged to dynamically adjust the amplitude of the surface wrinkling by adjusting the voltage applied between the top electrode and the bottom electrode based on a capacitance of the transparent top electrode.

10. A portable computing device having a glass display, the glass display including a tactile feedback system, the tactile feedback system comprising:
    a transparent portion of the glass display having a changeable surface which is switchable to be smooth or rough, wherein the changeable surface includes:
        a substrate,
        a transparent bottom electrode on top of the substrate,
        a transparent wrinkling layer on top of the transparent bottom electrode, wherein the transparent wrinkling layer includes an elastomer configured to expand along a lateral direction when compressed,
        a transparent top electrode on top of the transparent wrinkling layer, and
    wherein the transparent wrinkling layer via the elastomer changes from a smooth surface to a roughened surface upon application of a critical voltage between the top electrode and the bottom electrode,
        the critical voltage generating an electrostatic force mutually attracting the top and bottom electrodes to exert a compressive force upon the transparent wrinkling layer sufficient to generate a degree of surface wrinkling that is perceptible in response to touch by a user,
        wherein the degree of surface wrinkling upon the voltage application is a function of lateral normal strain, a Poisson's ratio, and a perpendicular normal strain of the wrinkling layer; and
    a capacitive sensing circuit configured and arranged to sense changes in the capacitance of the transparent portion when the user's finger approaches a minimum distance from the surface and the capacitive sensing circuit causes the application of the critical voltage, the critical voltage switching the transparent wrinkling layer from smooth to rough,
    wherein the roughened surface provides tactile feedback to the user so that the user may enter data into or respond to information from the portable computing device
wherein the changeable surface is configured to restrict the lateral expansion of the elastomer, therein causing buckling in the elastomer; and
wherein the surface wrinkling includes the buckling.

11. The portable computing device as recited in claim 10, wherein the capacitive sensing circuit is further configured and arranged to adjust an amplitude of the wrinkles based on a position and lateral speed of movement of the user's finger over the surface, thereby creating haptic feedback by a programmable friction.

12. The portable computing device as recited in claim 10, wherein the changeable surface includes at least one of the group consisting of: a keyboard, buttons, sliders, emoticons and wherein the function is based on, at least in part, lateral normal strain, being defined in view of the Poisson's ratio and the perpendicular normal strain.

13. The portable computing device as recited in claim 10, wherein electrostatic forces provide tactile feedback to the user and further including:
    a voltage source, wherein the capacitive sensing circuit is further configured and arranged to output a signal to the voltage source in response to the change in capacitance and the voltage source is configured and arranged, in response to thereto, to provide the critical voltage.

14. The portable computing device as recited in claim 10, wherein a displayed keyboard includes targeted reference keys, indicating a "home row" which the changeable surface generates.

15. The portable computing device as recited in claim 10, wherein the changeable surface is configured to generate a Braille surface corresponding to letters of a QWERTY keyboard.

16. The portable computing device as recited in claim 10, wherein the portable computing device is a sub-system of one of the following:
    an automotive dashboard control;
    an aviation instrument interface; a ship-board instrument interface;
    a submarine instrument interface; and
    a self-service kiosk customer-interface.

17. The portable computing device as recited in claim 10, wherein:
    the roughened surface has an amplitude proportional to the critical voltage applied between the top electrode and the bottom electrode; and
    the capacitive sensing circuit is configured and arranged to
        determine capacitance of the transparent portion, and
        adjust the amplitude of the roughened surface by adjusting the critical voltage applied between the top electrode and the bottom electrode based on the capacitance.

18. The portable computing device as recited in claim 17, further comprising
    a voltage source
wherein
    the user has a resistance to a chassis of the portable computing device; and
    the capacitive sensing circuit includes:
        an operational amplifier having a first input coupled to the chassis and a second input;
        a voltage source coupled between the second input and the bottom electrode; and
        a reference capacitor having a first terminal coupled to the second input and a second terminal coupled to an output of the operational amplifier.

19. The portable computing device as recited in claim 18, wherein a voltage of the output of the operation amplifier is a function of a voltage provided by the voltage source, a capacitance of the reference capacitor, and the capacitance sensed by the capacitive sensing circuit.

20. The portable computing device as recited in claim 10, wherein the transparent wrinkling layer is configured and arranged to provide a range of wavelengths and amplitudes of wrinkles and wherein the capacitive sensing circuit is further configured and arranged to adjust an amplitude of the wrinkles based on an input from a user that is indicative of the user's preferences for the amplitude of the wrinkles.

* * * * *